Oct. 9, 1945.  L. E. CONNELL ET AL  2,386,595
VEHICLE WHEEL BLOCK DEVICE
Filed Aug. 9, 1943  2 Sheets-Sheet 2

INVENTOR.
LLOYD E. CONNELL
LEWIS W. JONES
BY George B. White
ATTORNEY

Patented Oct. 9, 1945

2,386,595

UNITED STATES PATENT OFFICE 2,386,595

VEHICLE WHEEL BLOCK DEVICE

Lloyd E. Connell and Lewis W. Jones,
San Francisco, Calif.

Application August 9, 1943, Serial No. 498,014

3 Claims. (Cl. 188—4)

This invention relates to wheel block device for vehicles and the like.

An object of this invention is to provide a novel type of wheel block device which can be conveniently attached and installed on a vehicle, and which can be quickly lowered into wheel blocking position when needed and after use can be easily moved into an out of way position but ready for repeated use.

Another object of this invention is to provide a wheel block device which can be manipulated for lowering blocks into wheel blocking position or for raising them into an out of the way position by remote control convenient to the operator or driver of the vehicle, so as to obviate the need for the driver to leave the driver's compartment and to manually place blocks under the wheel.

Another object of this invention is to provide a wheel block device for vehicles which can be used either as a forward block or a rear block, and which is positively and quickly manipulated from a location remote from the wheel, and is carried on the vehicle frame and body in position for immediate use.

Another object of this invention is to provide a wheel blocking device which is highly useful and simple in construction. Convenience of arrangement, lightness and comparative inexpense of manufacture are further objects which have been borne in mind in the production and development of the invention.

We are aware that some changes may be made in the general arrangements and combinations of the several devices and parts, as well as in the details of the construction thereof without departing from the scope of the present invention as set forth in the following specification, and as defined in the following claims; hence we do not limit our invention to the exact arrangements and combinations of the said device and parts as described in the said specification, nor do we confine ourselves to the exact details of construction of said parts as illustrated in the accompanying drawings.

With the foregoing and other objects in view, which will be made manifest in the following detained description, reference is had to the accompanying drawings for the illustrative embodiment of the invention, wherein.

Figure 1:
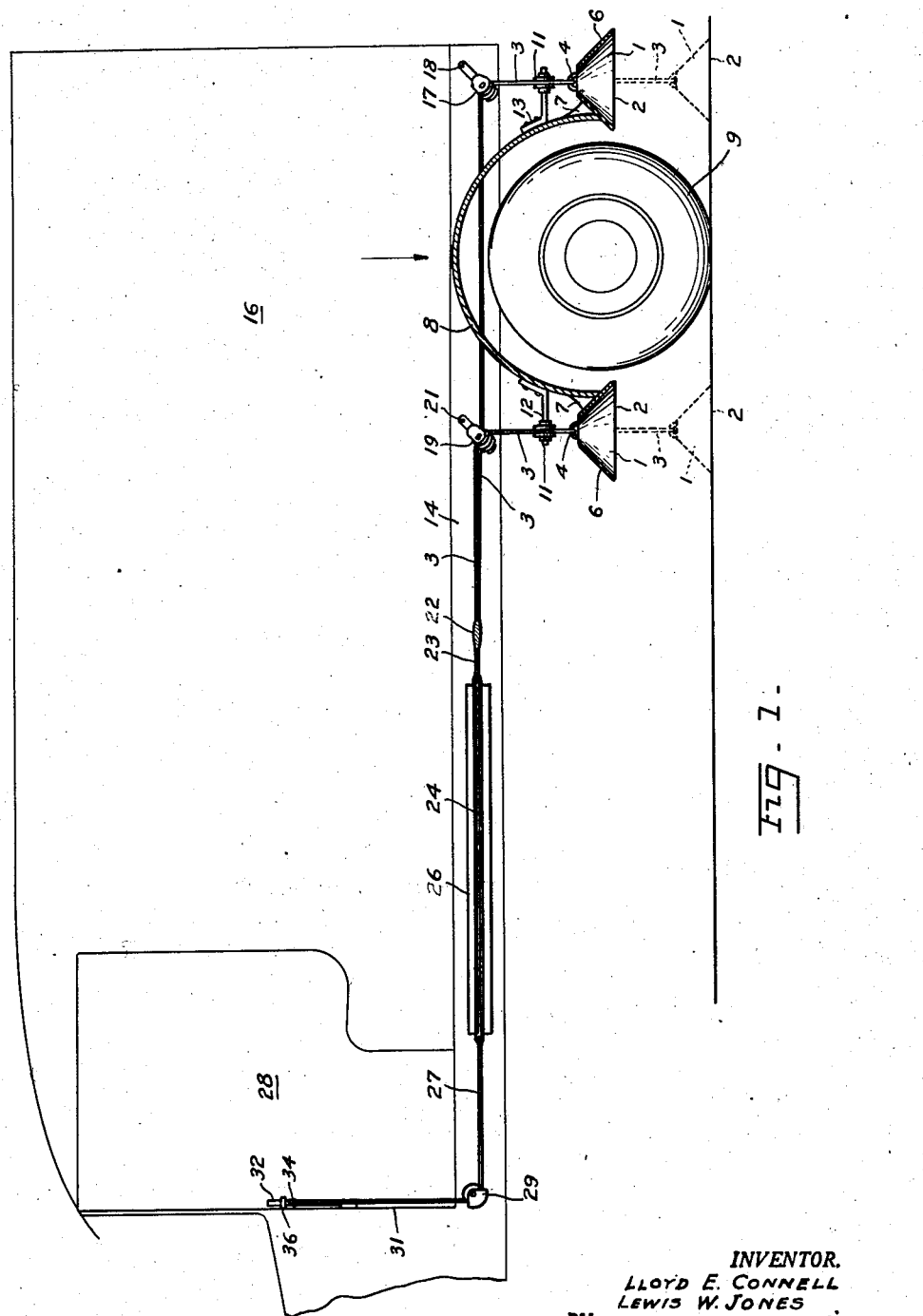
Fig. 1 is a side view of our block device installed on a truck.
Figure 2:
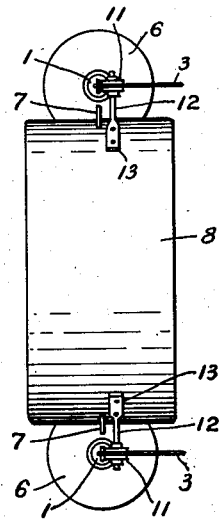
Fig. 2 is a top plan view of the parts of the block device adjacent the wheel.
Figure 3:
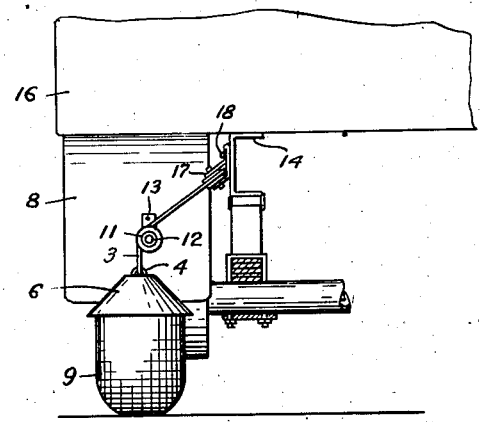
Fig. 3 is an end view of the device, the truck frame and body being partly broken away.

In carrying out our invention, in the herein illustrative embodiment, we show it applied to a delivery truck, which must be stopped frequently and at short intervals to make house to house deliveries, but the invention may be used on any other type of truck or vehicle where the blocking of wheels in this manner is needed. In the present illustration we show the use of two blocks, one in front of the other to the rear of the wheel.

Each block 1 is preferably made in a novel shape, although the device may be made in other more conventional shapes. The block 1 is substantially frusto-conical with a wide base 2 so as to offer good frictional contact with the ground. The block 1 tapers upwardly all around at a suitable angle, preferably of the average angle between the wheel and the ground at the front or in the rear. This frusto-conical shape assures firm and proper engagement with the wheel even though the block may be turned around its axis when lowered. In other words, all the sides of the blocks all around are capable of equally efficient engagement with the wheel for blocking it. The blocks may be made of any suitable material, but heretofore in practice blocks made of solid wood worked very well.

From the top of each block 1 extends a flexible line 3. The lines 3 may be made of any suitable material, such as metal cable, or rope or the like. The line 3 is suitably secured to the block 1, for instance by tying to loop 4 as shown.

A block holder 6 is provided above the position of each block 1. Each block holder 6 is suitably supported on the vehicle. In the herein illustration the block holders 6 are supported on brackets 7 extending from the opposite sides of the fender 8 of the truck. Each block holder 6 is a hollow shield which snugly fits over the block 1. It is preferable to mount the holders 6 as close to the periphery of the wheel 9 as feasible, although the holders 6 are to be spaced always from the periphery of the wheel 9. The holders 6 are open at the top and the respective lines 3 extend through the tops of the holders 6.

Centered above each holder 6 is a guide pulley 11 which is supported on a bracket bar 12, which latter in turn is secured at 13 to the fender 8 of the truck. The guide pulleys 11 are journaled on an axis, in this illustration, substantially at right angles to the wheel axis so as to guide the lines 3 into and out of the holders 6 when the blocks 1 are respectively lowered and raised. The line 3 of the block 1 to the rear of the wheel 9 is positioned above the guide pulley 11 so that it extends toward the frame 14 of the truck below the truck body 16 and is played around another pulley 17 so that it continues forwardly along the side of the frame 14. This pulley 17 on the frame is swingably supported on a pivot or hook 18 in said frame 14. The other line 3 of the other block 1 also extends above the guide pulley 11 and toward the frame 14 and over one of the pulleys of a double pulley 19. The first or rear line 3 is played around the other pulley of this pulley 19. The double pulley 19 is swingably mounted on the side of the frame 14 on a pivot or hook 21.

For simultaneous operation of both blocks 1, the lines 3 are united together at a point spaced forwardly of the double pulley 19. This joint 22 where the lines 3 are spliced or otherwise united is at such distance from the double pulley 19 as to allow free passage of the lines 3 through the double pulley 19 for lowering the blocks 1. The single draw line 23 continuing forwardly from the joint 22 may be extended directly to the controls if so desired. In the present illustrative embodiment the draw line 23 is connected to a rigid insert 24, which latter is guided in guide rails 26 along the side of the frame 14. The insert 24 slides between the guide rails 26 when the blocks 1 are lowered or raised. A forward draw line 27 is secured to the forward end of the rigid insert 24 and extends along the side of the frame 14 to below the driver's compartment 28. The forward draw line 27 is played around a pulley 29 and extends upwardly through the floor of the body and along a vertical frame member 31 of the body 16.

Figure 5:
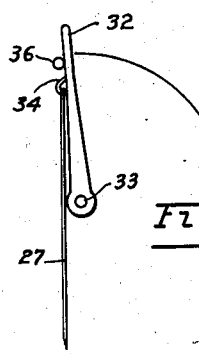
Fig. 5 is a detail view of the handle control for manipulating the block device.

The end of the forward draw line 27 is located in convenient reach of the driver or operator at one side of the instrument board and means are being provided to secure the end of this forward draw line 27 when the blocks 1 are pulled up into the out of way position. In the herein illustration such securing means are combined with a manipulating handle 32. This handle 32 is pivoted on the vertical frame member 31 so that it can be turned around its horizontal pivot 33 in a vertical plane parallel with the frame member 31, as shown in Figures 1 and 5. The end of the forward draw line 27 is suitably tied or secured to a loop or hook 34 of the handle 32 at such distance from the pivot 33 that when the handle 32 is turned in clockwise direction viewing from the driver's seat, the line 27 is passed in front of the pivot 33 and plays out the lines 27, 25 and 3 sufficiently to allow the blocks to drop to the ground. It is to be noted that the weight of the blocks 1 is enough to pull the lines when the handle is released. In order to pull the blocks 1 up into the out of way position the handle 32 is turned in contraclockwise direction viewing Fig. 5 so as to raise the end of the forward draw line 27 to above the handle pivot 33. The handle 32 is turned over center with respect its pivot 33 so that the weight of the blocks 1 exerts a contraclockwise pull or moment on the handle 32 viewing Fig. 5. A stop 36 limits the back swing of the handle 32 and the weight of the blocks 1 functions to hold the device in inoperative position.

Figure 4:
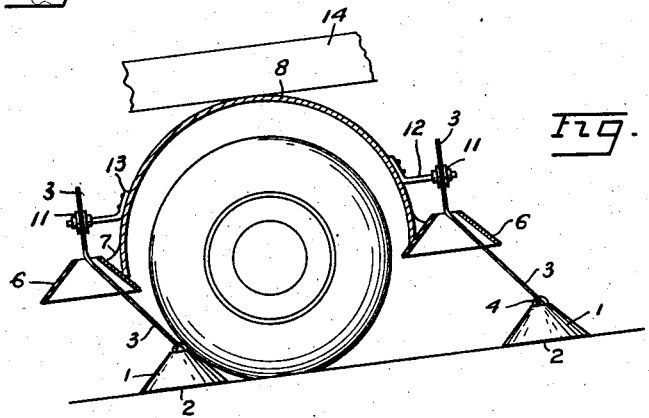
Fig. 4 is a side view of the parts of the device adjacent the wheel, showing the wheel rolled against one of the blocks.

It is to be also noted that the lines are of such length that the device provides sufficient slack after the blocks 1 are dropped to permit the blocks to remain in place while the truck is rolled against either of the blocks 1, as illustrated in Fig. 4.

Figure 6:
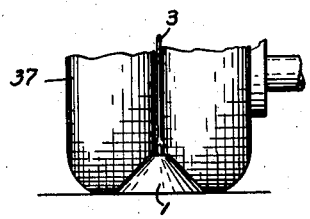
Fig. 6 is fragmental end view of a double wheel and its relation to the block.

When the wheel blocks are used in connection with double wheels as shown in Fig. 6 the centers of the block holders 6 and vertical portions of the lines 3 are in the plane of the dividing space between the tires of the double wheel 37. Thus the blocks 1 are guided so as to be positioned on the ground between the tires of the double wheel 37 so that both tires engage the block 1 on their adjacent inner portions of their periphery.

In operation whenever the truck or vehicle is left with the engine running, or on an incline, or in a position where for any reason the wheels have to be blocked, the driver after stopping the truck turns the handle 32 in a clockwise direction as heretofore described. The weight of the blocks 1 pulls the lines 3, 23 and 27 respectively downwardly and rearwardly until the blocks 1 rest on the ground. Then the driver advances the truck in the direction in which the block is to be applied. Usually the driver permits the truck to roll on the incline against the block 1. When starting again the driver can return directly to the driver's seat and back or move the truck off the block by the usual driving means not shown, and as soon as the block 1 is free, turns the handle 32 in contraclockwise direction, thereby pulling the blocks 1 off the ground and up into the holders 6. These holders prevent loose dangling of the blocks 1 in the out of way positions. The weight of the blocks 1 now pulls the handle in contraclockwise direction around the handle pivot 33 and holds it against the stop 36 thereby secures the entire wheel block system in inoperative position until it is needed again.

The device is simple to install and simple to operate. It saves time and labor, and also lends added safety of operation in situations where trucks or vehicles have to use blocks for the wheels. The position of the actuating handle in the driver's seat clearly indicates whether the blocks are on the ground or in out of way position and thereby avoids accidents that may be caused by starting the vehicles while the blocks are still in place. This in addition to the safety provided by the positive blocking herein described greatly improves the efficiency and economy of truck handling and operation.

We claim:

1. In a block device for the wheel of a vehicle, the combination with a block suspended on a line from the vehicle so as to be raised and lowered by said line; of a guide holder on the vehicle adjacent the wheel to be blocked, said holder being spaced from but being aligned with the periphery of said wheel substantially above the predetermined ground position of said block relatively to said wheel, and means to guide said line so as to pull said block to said holder when the block is raised, and to lower said block to the ground opposite said wheel periphery.

2. In a vehicle wheel block device, a substantially frusto-conical block, and means to lower and raise said block in alignment with the periphery of the wheel to be blocked.

3. In a vehicle wheel block device, a substantially frusto-conical block, means to lower and raise said block in alignment with the periphery of a wheel to be blocked, and a hollow holder substantially fitting the surface of said block, said holder being secured to the vehicle to hold said block in raised position.

LLOYD E. CONNELL.
LEWIS W. JONES.